United States Patent [19]

Doery

[11] Patent Number: 4,797,048

[45] Date of Patent: Jan. 10, 1989

[54] BINDING APPARATUS

[75] Inventor: Michael S. Doery, Rochester, N.Y.

[73] Assignee: Xerox Corporation, Stamford, Conn.

[21] Appl. No.: 94,369

[22] Filed: Sep. 8, 1987

[51] Int. Cl.[4] .......................... B42C 13/04; B42C 9/00; H02K 7/06; G03G 15/00

[52] U.S. Cl. .......................................... 412/11; 412/37; 310/80; 355/3 SH

[58] Field of Search ........................ 412/14, 16, 11, 33, 412/36, 37, 40, 41, 900, 902; 100/3, 4, 8, 29, 31, 32; 310/80, 83; 318/372; 355/3 SH

[56] References Cited

U.S. PATENT DOCUMENTS

| | | | |
|---|---|---|---|
| 3,531,358 | 9/1970 | Rost et al. | 412/37 |
| 3,902,646 | 9/1975 | Kuhns | 412/37 |
| 3,926,712 | 12/1975 | Wetzler et al. | 412/37 |
| 3,953,277 | 4/1976 | Kuhns | 412/37 |
| 4,134,672 | 1/1979 | Burlew | 355/14 SH |
| 4,393,319 | 7/1983 | Bock | 310/80 |
| 4,532,462 | 7/1985 | Washbourn | 310/83 |
| 4,546,296 | 10/1985 | Washbourn et al. | 318/372 |
| 4,688,924 | 8/1987 | Anzai | 355/3 SH |
| 4,712,908 | 12/1987 | Nakayama et al. | 355/3 SH |

*Primary Examiner*—Frank T. Yost

*Assistant Examiner*—Paul M. Heyrana, Sr.

*Attorney, Agent, or Firm*—H. Fleischer; J. E. Beck; R. Zibelli

[57] ABSTRACT

An apparatus which binds a set of sheets by applying a tape having an adhesive thereon to the spine of the set of sheets. A heated plate is resiliently urged into contact with the tape with a force selected to optimize adhesive melt and flow.

12 Claims, 3 Drawing Sheets

BINDING APPARATUS

This invention relates generally to an electrophotographic printing machine, and more particularly concerns an apparatus for binding sets of finished copy sheets.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charge thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. Heat is then applied to the toner particles to permanently affix the powder image to the copy sheet. The copy sheets are then collected and adhesive is applied to the spine to bind the sheets together into sets of copy sheets. The bound sets of copy sheets are then stacked for presentation to the machine operator.

In a high speed commercial printing machine of the foregoing type, the sets of copy sheets are frequently adhesively bound together. Various types of adhesive binding techniques may be used. For example, a liquid adhesive may be applied to the spine of a moving set of copy sheets, or the copy sheets may be stationary and a bottle containing a liquid adhesive moved along the spine to apply the adhesive thereon. Alternatively, a tape having an adhesive on one surface thereof may be positioned in contact with the spine and heat applied thereto so as to cause the adhesive to flow between the sheets in the region of the spine securing the sheets together. When a tape is employed, it is desirable to be able to repeat the force applied thereon. Moreover, it is advantageous to regulate the force applied on the tape as a function of the thickness of the set of copy sheets. In this way, the amount of of adhesive flowing between the sheets, in the vicinity of the spine, is optimized. Various approaches have been devised for applying a variable, accurate and repeatable force, the following disclosures appear to be relevant:

U.S. Pat. No. 4,393,319; Patentee: Bock; Issued: July 12, 1983.

U.S. Pat. No. 4,510,406; Patentee: Morishita; Issued Apr. 9, 1985.

U.S. Pat. No. 4,532,462; Patentee: Washbourn et al.; Issued: July 30, 1985.

U.S. Pat. No. 4,546,295; Patentee: Wickham et al.; Issued: Oct. 8, 1985.

U.S. Pat. No. 4,546,296; Patentee: Washbourn et al.; Issued: Oct. 8, 1985.

U.S. Pat. No. 4,546,297; Patentee: Washbourn et al.; Issued: Oct. 8, 1985.

U.S. Pat. No. 4,546,298; Patentee: Wickham et al.; Issued: Oct. 8, 1985.

The relevant portions of the foregoing patents may be summarized as follows:

Bock discloses an actuator using a coil spring in conjunction with a stepping motor for aiding in moving a shaft in one direction and preventing rotation of the shaft relative to the motor housing. When the rotor rotates, the shaft translates axially.

Morishita describes a starting device used in combination with a speed reduction device for reducing the revolution of a driving shaft to transmit power to a rotary output shaft.

Washbourn et al. (U.S. Pat. No. 4,532,462), Wickham et al. (U.S. Pat. No. 4,546,295), Washbourn et al. U.S. Pat. No. 4,546,296), Washbourn et al. (U.S. Pat. No. 4,546,297), and Wickham et al (U.S. Pat. No. 4,546,298) all disclose an electric actuator having an electric motor operable to control the output force generated by a spring system by controlling the length of a spring of the system. The spring system includes a power spring or a combination of a power spring and a control spring with the output force being exerted by the power spring.

In accordance with one aspect of the present invention, there is provided an apparatus for binding a set of sheets by applying a tape having adhesive thereon to the spine of the set of sheets. The apparatus includes means for holding the set of sheets. A member is adapted to apply heat to the tape. A spring is operatively associated with the member. Means compress the spring a preselected distance so that the spring presses the member against the tape with a preselected force.

Pursuant to another aspect of the features of the present invention, there is provided an electrophotographic printing machine of the type in which successive copy sheets having indicia recorded thereon are compiled into sets and the sheets of each set are bound together by applying a tape having adhesive thereon to the spine of the set of sheets. The improved binding apparatus includes means for holding the set of sheets. A member is adapted to apply heat to the tape. A spring is operatively associated with the member. Means compress the spring a preselected distance so that the spring presses the member against the tape with a preselected force.

Other aspects of the present invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention as defined by the appended claims.

Figure 1:
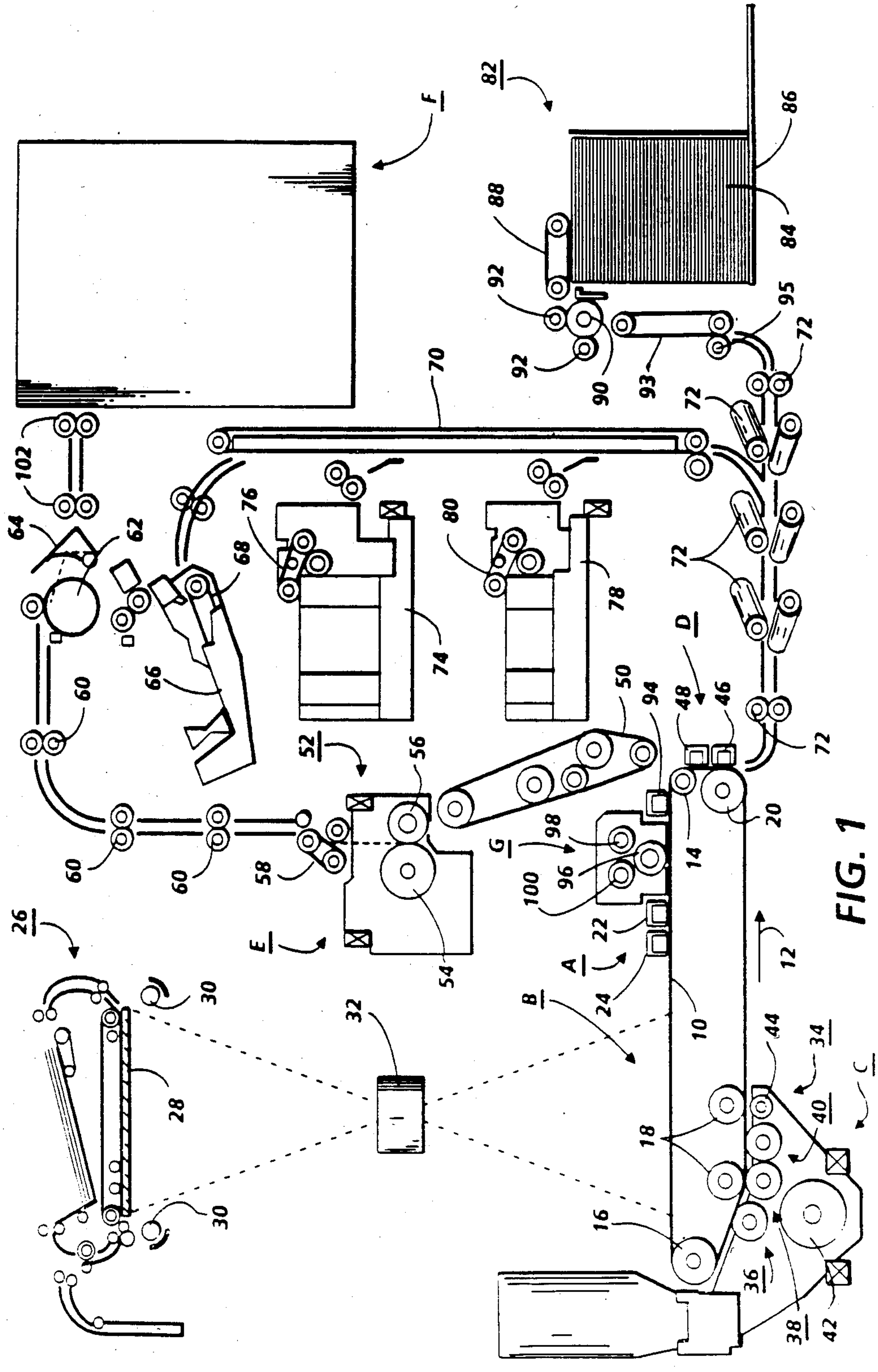
FIG. 1 is a schematic elevational view depicting an illustrative electrophotographic printing machine incorporating the sheet binding apparatus of the present invention therein.

For a general understanding of the features of the present invention, reference is made to the drawings. In the drawings, like reference numerals have been used throughout to identify identical elements. FIG. 1 schematically depicts an electrophotographic printing machine incorporating the features of the present invention therein. It will become evident from the following discussion that the apparatus of the present invention may be employed in a wide variety of devices and is not specifically limited in its application to the particular embodiment depicted herein.

Referring to FIG. 1 of the drawings, the electrophotographic printing machine employs a photoconductive belt 10. Preferably, the photoconductive belt 10 is made from a photoconductive material coated on a ground layer, which, in turn, is coated on a anti-curl backing layer. The photoconductive material is made from a transport layer coated on a generator layer. The transport layer transports positive charges from the generator layer. The interface layer is coated on the ground layer. The transport layer contains small molecules of di-mtolydiphenylbiphenyldiamine dispersed in a polycarbonate. The generation layer is made from trigonal selenium. The grounding layer is made from a titanium coated Mylar. The ground layer is very thin and allows light to pass therethrough. Other suitable photoconductive materials, ground layers, and anti-curl backing layers may also be employed. Belt 10 moves in the direction of arrow 12 to advance successive portions of the photoconductive surface sequentially through the various processing stations disposed about the path of movement thereof. Belt 10 is entrained about stripping roller 14, tensioning roller 16, idler rollers 18, and drive roller 20. Stripping roller 14 and idler rollers 18 are mounted rotatably so as to rotate with belt 10. Tensioning roller 16 is resiliently urged against belt 10 to maintain belt 10 under the desired tension. Drive roller 20 is rotated by a motor coupled thereto by suitable means such as a belt drive. As roller 20 rotates, it advances belt 10 in the direction of arrow 12.

Initially, a portion of the photoconductive surface passes through charging station A. At charging station A, two corona generating devices, indicated generally by the reference numerals 22 and 24 charge photoconductive belt 10 to a relatively high, substantially uniform potential. Corona generating device 22 places all of the required charge on photoconductive belt 10. Corona generating device 24 acts as a leveling device, and fills in any areas missed by corona generating device 22.

Next, the charged portion of photoconductive belt 10 is advanced through imaging station B. At imaging station B, a document handling unit, indicated generally by the reference numeral 26, is positioned over platen 28 of the printing machine. Document handling unit 26 sequentially feeds documents from a stack of documents placed by the operator in the document stacking and holding tray. The original documents to be copied are loaded face up into the document tray on top of the document handling unit. A document feeder located below the tray forwards the bottom document in the stack to rollers. The rollers advance the document onto the platen 28. When the original document is properly positioned on platen 28, a belt transport is lowered onto the platen with the original document being interposed between the platen and the belt transport. After imaging, the original document is returned to the document tray from platen 28 by either of two paths. If a simplex copy is being made or if this is the first pass of a duplex copy, the original document is returned to the document tray via the simplex path. If this is the inversion pass of a duplex copy, then the original document is returned to the document tray through the duplex path. Imaging of a document is achieved by two Xenon flash lamps 30 mounted in the optics cavity which illuminate the document on platen 28. Light rays reflected from the document are transmitted through lens 32. Lens 32 focuses light images of the original document onto the charged portion of the photoconductive surface of belt 10 to selectively dissipate the charge thereon. This records an electrostatic latent image on photoconductive belt 10 which corresponds to the informational areas contained within the original document. Thereafter, photoconductive belt 10 advances the electrostatic latent image recorded thereon to development station C.

At development station C, a magnetic brush developer unit, indicated generally by the reference numeral 34, has three developer rolls, indicated generally by the reference numerals 36, 38 and 40. A paddle wheel 42 picks up developer material and delivers it to the developer rolls. When developer material reaches rolls 36 and 38, it is magnetically split between the rolls with half the developer material being delivered to each roll. Photoconductive belt 10 is partially wrapped about rolls 36 and 38 to form extended development zones. Developer roll 40 is a cleanup roll. Magnetic roll 44 is a carrier granule removal device adapted to remove any carrier granules adhering to belt 10. Thus, rolls 36 and 38 advance developer material into contact with the electrostatic latent image. The latent image attracts toner particles from the carrier granules of the developer material to form a toner powder image on the photoconductive surface of belt 10. Belt 10 then advances the toner powder image to transfer station D.

At transfer station D, a copy sheet is moved into contact with the toner powder image. First, photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detack the copy sheet from belt 10. Conveyor 50 advances the copy sheet to fusing station E.

Fusing station E includes a fuser assembly, indicated generally by the reference numeral 52 which permanently affixes the transferred toner powder image to the copy sheet. Preferably, fuser assembly 52 includes a heated fuser roller 54 and a pressure roller 56 with the powder image on the copy sheet contacting fuser roller 54. The pressure roller is camed against the fuser roller to provide the necessary pressure to fix the toner powder image to the copy sheet. The fuser roll is internally heated by a quartz lamp. Release agent, stored in a reservoir, is pumped to a metering roll. A trim blade trims off the excess release agent. The release agent transfers to a donor roll and then to the fuser roll.

After fusing, the copy sheets are fed through a decurler 58. Decurler 58 bends the copy sheet in one direction to put a known curl in the copy sheet and then bends it in the opposite direction to remove that curl.

Forwarding rollers 60 then advance the sheet to duplex turn roll 62. Duplex solenoid gate 64 guides the sheet to the finishing station F or to duplex tray 66. The details of finishing station F will be described hereinafter with reference to FIG. 2. Duplex solenoid gate 64 diverts the sheet into duplex tray 66. The duplex tray 66 provides an intermediate or buffer storage for those sheets that have been printed on one side and on which an image will be subsequently printed on the second, opposed side thereof, i.e. the sheets being duplexed. The sheets are stacked in duplex tray 66 face down on top of one another in the order in which they are copied.

In order to complete duplex copying, the simplex sheets in tray 66 are fed, in seriatim, by bottom feeder 68 and tray 66 back to transfer station D via conveyor 70 and rollers 72 for transfer of the toner powder image to the opposed sides of the copy sheets. Inasmuch as successive bottom sheets are fed from duplex tray 66, the proper or clean side of the copy sheet is positioned in contact with belt 10 at transfer station D so that the toner powder image is transferred thereto. The duplex sheet is then fed through the same path as the simplex sheet to be advanced to finishing station F.

Copy sheets are fed to transfer station D from the secondary tray 74 The secondary tray 74 includes an elevator driven by a bidirectional AC motor. Its controller has the ability to drive the tray up or down. When the tray is in the down position, stacks of copy sheets are loaded thereon or unloaded therefrom. In the up position, successive copy sheets may be fed therefrom by sheet feeder 76. Sheet feeder 76 is a friction retard feeder utilizing a feed belt and take-away rolls to advance successive copy sheets to transport 70 which advances the sheets to rolls 72 and then to transfer station D.

Copy sheets may also be fed to transfer station D from the auxiliary tray 78. The auxiliary tray 78 includes an elevator driven by a bidirectional AC motor. Its controller has the ability to drive the tray up or down. When the tray is in the down position, stacks of copy sheets are loaded thereon or unloaded therefrom. In the up position, successive copy sheets may be fed therefrom by sheet feeder 80. Sheet feeder 80 is a friction retard feeder utilizing a feed belt and take-away rolls to advance successive copy sheets to transport 70 which advances the sheets to rolls 72 and then to transfer station D.

Secondary tray 74 and auxiliary tray 78 are secondary sources of copy sheets. A high capacity feeder, indicated generally by the reference numeral 82, is the primary source of copy sheets. High capacity feeder 82 includes a tray 84 supported on an elevator 86. The elevator is driven by a bidirectional motor to move the tray up or down. In the up position, the copy sheets are advanced from the tray to transfer station D. A vacuum feed belt 88 feeds successive uppermost sheets from the stack to a take away drive roll 90 and idler rolls 92. The drive roll and idler rolls guide the sheet onto transport 93. Transport 93 and idler roll 95 advance the sheet to rolls 72 which, in turn, move the sheet to transfer station station D.

Invariably, after the copy sheet is separated from the photoconductive surface of belt 10, some residual particles remain adhering thereto. After transfer, photoconductive belt 10 passes beneath corona generating device 94 which charges the residual toner particles to the proper polarity. Thereafter, the precharge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 96 and two de-toning rolls 98 and 100, i.e. waste and reclaim de-toning rolls. The reclaim roll is electrically biased negatively relative to the cleaner roll so as to remove toner particles therefrom. The waste roll is electrically biased positively relative to the reclaim roll so as to remove paper debris and wrong sign toner particles. The toner particles on the reclaim roll are scraped off and deposited in a reclaim auger (not shown), where it is transported out of the the rear of cleaning station G.

The various machine functions are regulated by a controller. The controller is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the documents and the copy sheets. In addition, the controller regulates the various positions of the gates depending upon the mode of operation selected.

Figure 2:
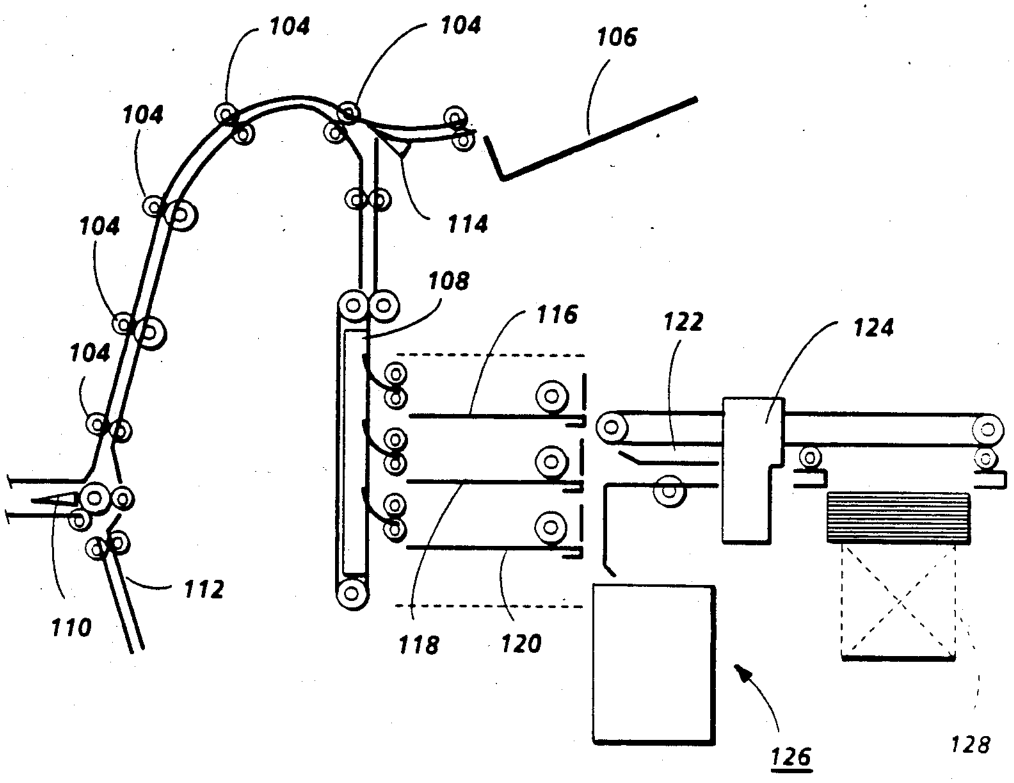
FIG. 2 is a schematic elevational view showing the finishing station of the FIG. 1 printing machine with the sheet binding apparatus.

Referring now to FIG. 2, the general operation of finishing station F will now be described. Finishing station F receives fused copies from rolls 102 (FIG. 1) and delivers them to solenoid actuated gate 110. Gate 110 diverts the copy sheet to either registration rolls 104 or inverter 112. A tri-roll nip is used to drive sheets into and out of the inverter. Inverter 112 has a compression spring which assists in reversing the direction of the sheets and assists in driving them out of the inverter. Inverter 112 is driven by a reversible AC motor. Two cross roll registration nips are used to register the sheets. The cross roll registration nips are driven by the sheet path drive motor. Rolls 104 advance the copy sheets to gate 114. Gate 114 diverts the sheets to either the top tray 106 or to vertical transport 108. Vertical transport 108 is a vacuum transport which transport sheets to any one of three bins 116, 118 or 120. Bins 116, 118, and 120 are used to compile and register sheets into sets. The bins are driven up or down by a bidirectional AC bin drive motor adapted to position the proper bin at the unloading position. A set transport 122 has a pair of set clamps mounted on two air cylinders and driven by four air valve solenoids. Two of the air valves are used for positioning the set transport and two are used for the retract function. The set transport is used to transport sets from the bins to sheet stapling apparatus 124, binder 126 and sheet stacker 128. The detailed structure of binder 126 will be described hereinafter with reference to FIG. 3. The stapled, bound, or unfinished sets are delivered to stacker 128 where they are stacked for delivery to the operator.

Figure 3:
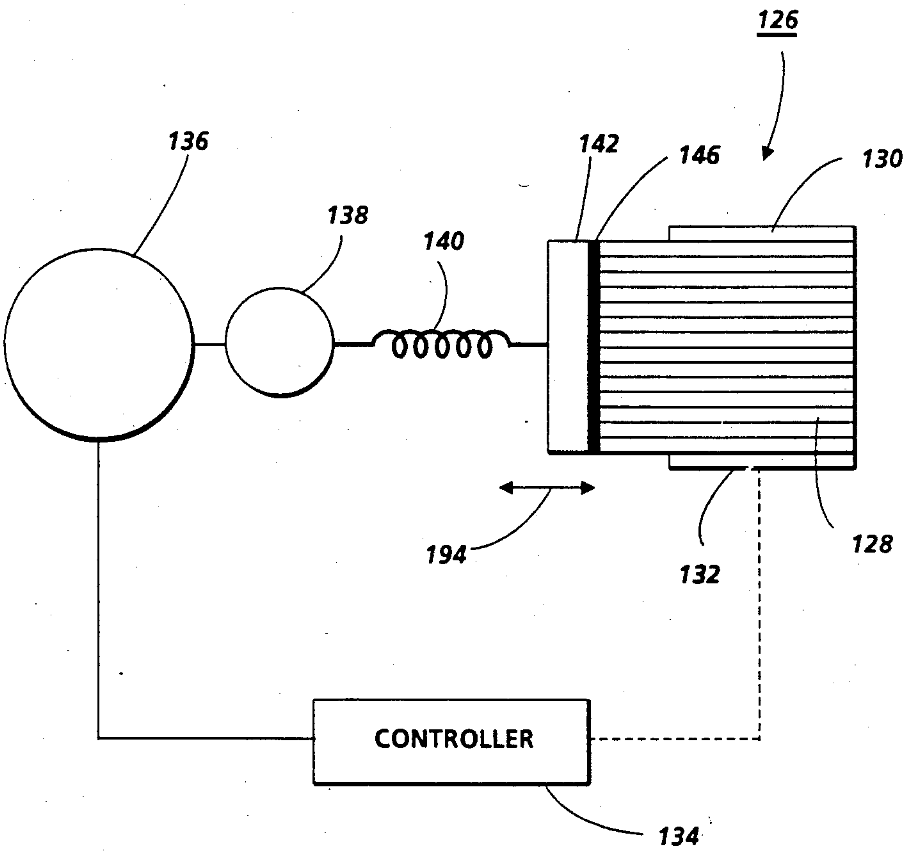
FIG. 3 is a schematic elevational view further illustrating the binding apparatus of the FIG. 2 finishing station.

Turning now to FIG. 3, there is shown the structure of binding apparatus 126. As depicted thereat, a set of copy sheets 128 is advanced to binder 126. Side plates 130 and 132 translate into engagement with the uppermost and lowermost sheets of the set of copy sheets 128. The distance between plates 130 and 132 corresponds to the thickness of the set of copy sheets. This distance is detected and a signal corresponding thereto transmitted to controller 134. The distance between plates 130 and 132 may be determined by a wide variety of sensors. For example, the movement of the plates may be used to change the resistance of a potentiometer so as to generate a variable voltage dependent upon the distance between plates 130 and 132. Alternatively, a series of light emitting diodes and photosensors can be employed, with the distance between plates 130 and 132 being a function of the light path broken in any case, a signal is transmitted to controller 134 indicating the distance between plates 130 and 132 which corresponds to the thickness of the set of copy sheets 128. Controller 134 transmits a control signal to stepping motor 136. The control signal causes stepping motor 136 to rotate through an angle. Stepping motor 136 is coupled to a speed reducer 138 which reduces the angular output from the motor. Speed reducer 138 is connected to one end of torsion spring 140. The other end of torsion spring 140 is connected to plate 142. Plate 142 is mounted slidably in binder 126 so as to reciprocate in the direction of arrow 144. Heat is applied to plate 142. Plate 142 may be heated internally or externally by suitable resistance heating elements.

In operation, plate 142 is retracted and spaced from the edge or spine of the set of copy sheets 128. A tape 146 having adhesive on the surface thereof engaging the spine of the set of copy sheets is positioned in contact with the spine. The tape 146 is cut to size prior to being positioned in contact with the spine of the set of copy sheets. After tape 146 is positioned in contact with the spine, controller 134 energizes stepper motor 136 to rotate through the required number of steps, i.e. angle. The angular output from speed reducer 138 is less than the angular output from motor 136. Speed reducer 138 rotates torsion spring 140 so as to compress spring 140. As spring 140 compresses, it applies a force on heated plate 142 causing it to slide into engagement with tape 146 and apply a preselected force thereon. The heat and pressure applied on tape 146 cause the adhesive thereon to melt and be interposed between adjacent sheets of the set in the region of the spine thereof. Thus, by selecting the force necessary to optimize binding for different thickness sets, controller 134 will transmit a signal to drive stepper motor 136 through the required number of steps to rotate speed reducer 138 through the required angle. Speed reducer 138, in turn, rotates torsion spring 140 through the required angle necessary to compress spring 140 the amount required to apply the selected force on plate 142 optimizing the binding process. Preferably, stepping motor 136 is a 200 step/revolution motor. Speed reducer 138 is preferably a 1:120 reduction worm gear pair. Torsion spring 140 produces 15 inch-pounds when wound 270°. With these parameters, the system has a resolution of $(8.33)(10^{-4})$ inch-pounds/step.

In recapitulation, the binding apparatus of the present invention employs a stepper motor to rotate a torsion spring though a selected angle so as to apply a selected force on a heated plate pressing against a tape having adhesive thereon. The tape is in engagement with the spine of a set of copy sheets. The heated plate applies a pressure on the tape to optimize adhesive melt and flow for binding.

It is, therefore, evident that there has been provided, in accordance with the present invention, an apparatus that fully satisfies the aims and advantages hereinbefore set forth. While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. An apparatus for binding a set of sheets by applying a tape having adhesive thereon to the spine of the set of sheets, including:
- a heated member;
- means for detecting the thickness of the set of sheets;
- a spring operatively associated with said heated member; and
- means, responsive to said detecting means, for compressing said spring a distance dependent upon the detected thickness of the set of sheets so that said spring presses said heated member against the tape with a force dependent upon the detected thickness of the set of sheets to optimize adhesive melt and flow for binding.

2. An apparatus according to claim 1, wherein said spring is a torsion spring.

3. An apparatus according to claim 2, wherein said compressing means includes a motor coupled to said torsion spring to rotate said torsion spring through a preselected angle to apply the preselected force on said member.

4. An apparatus according to claim 3, wherein said compressing means includes means, interposed between said motor and said spring, for rotating said torsion spring with said torsion spring rotating through an angle less than the angle that said motor rotates through.

5. An apparatus according to claim 4, wherein said rotating means includes a pair of worm gears meshing with one another and having a reduction ratio so that the angle that said torsion spring rotates through is less than the angle that said motor rotates through.

6. An apparatus according to claim 5, wherein said heated member includes a heated plate.

7. An electrophotographic printing machine of the type in which successive copy sheets having indicia recorded thereon are compiled into sets and the sheets of each set are bound together by applying a tape having adhesive thereon to the spine of the set of sheets, wherein the improved binding apparatus includes:
- a heated member;
- means for detecting the thickness of the set of sheets;
- a spring operatively associated with said heated member; and
- means, responsive to said detecting means, for compressing said spring a distance dependent upon the detected thickness of the set of sheets so that said spring presses said heated member against the tape with a force dependent upon the detected thickness of the set of sheets to optimize adhesive melt and flow for binding.

8. A printing machine according to claim 7, wherein said spring is a torsion spring.

9. A printing machine according to claim 8, wherein said compressing means includes a motor coupled to said torsion spring to rotate said torsion spring through a preselected angle to apply the preselected force on said member.

10. A printing machine according to claim 9, wherein said compressing means includes means, interposed between said motor and said spring, for rotating said torsion spring with said torsion spring rotating through an angle less than the angle that said motor rotates through.

11. A printing machine according to claim 10, wherein said rotating means includes a pair of worm gears meshing with one another and having a reduction ratio so that the angle that said torsion spring rotates through is less than the angle that said motor rotates through.

12. A printing machine according to claim 11, wherein said heated member includes a heated plate.

* * * * *